Feb. 16, 1965 S. P. BARTLES ETAL 3,169,722
PHOTOGRAPHIC ROLL FILM
Filed Oct. 26, 1961

STANLEY P. BARTLES
DONALD R. BARTHOLOMAY
INVENTORS

BY R. Frank Smith
Armin B. Pagel

ATTORNEYS

3,169,722
PHOTOGRAPHIC ROLL FILM
Stanley P. Bartles and Donald R. Bartholomay, both of Rochester, N.Y., assignors to Eastman Kodak Company, Rochester, N.Y., a corporation of New Jersey
Filed Oct. 26, 1961, Ser. No. 147,915
8 Claims. (Cl. 242—74)

The present invention relates to photographic roll film of the type in which a film strip is permanently attached to a film supply spool.

When such film, for example, cassette loaded 35 mm. film, is employed in a camera, the film winding mechanism is stopped at the end of the roll by the tension of the film, after which the exposed film must be rewound onto the cassette before the camera is opened. Although the adhesive tape connection customarily employed is usually of sufficient strength to resist separation of the film end from the supply spool, such separation nevertheless occasionally occurs due to the application of an excessive amount of force to the winding knob or the winding lever of the camera, and results in a complete loss of the film unless the camera is unloaded and the film rewound in darkness. While such separation of the film from the spool in manually wound cameras occurs rather infrequently and in most instances through the fault of the operator, this situation is much more prevalent when the film is used in cameras having power actuated film advance mechanisms which may exert tension on the connection for an extended length of time, thereby causing the film and tape to slide relative to each other as the adhesive material slowly flows under the continuous tension.

It is therefore a primary object of the present invention to strengthen the connection between a strip of film and the tape by means of which the film is attached to its supply spool. Another object of the invention is to strengthen such a connection by forming a mechanical connection between the film and the tape. Still another object of the invention is to provide such a mechanical connection comprising interlocking portions of the tape and the film. Another object of the invention is to form interlocking portions of the web and film which will retain their interlocking relation when the spool is wound with film. Yet another object of the invention is to so strengthen the connection between the tape and the film strip in a simple, rapid and economical manner, adaptable for employment with conventional film spooling machinery. These and other important objects of the invention will be readily apparent by reference to the following description and the accompanying drawings in which:

Figure 1:
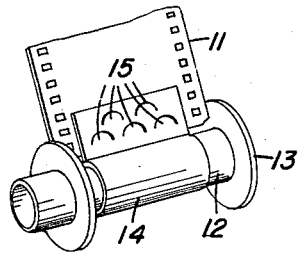
FIG. 1 is a partial perspective view of a roll of film according to the preferred embodiment of the invention showing the end of a film strip attached to a film supply spool by means of a tape.
Figure 5:
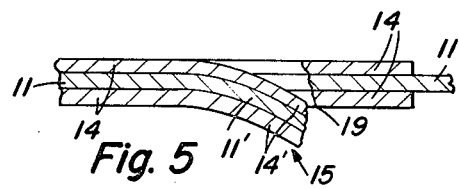
FIG. 5 is a cross sectional view of the film and tape along the line 5—5 of FIG. 2 prior to any slippage between the film and tape.
Figure 6:
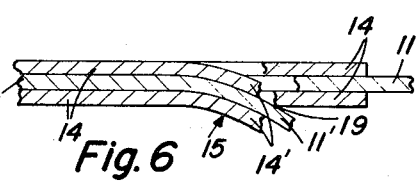
FIG. 6 is a cross sectional view along the line 5—5 of FIG. 2 showing the manner in which the tape and film become mechanically interlocked upon the occurrence of slippage between the adjacent layers.

Referring now to the drawings, FIG. 1 shows the end of a strip of film 11 attached to the core 12 of a film spool 13 by a length of adhesively coated tape 14 which encircles the core with the ends of the strip adhesively bonded to the opposite surfaces of the end of the film strip. In order to strengthen the adhesive connection thus formed, the present invention contemplates forming groups of adjacent tongues in the tape and film. Each of these groups, designated at 15, comprises two outer tongues 14' formed in the tape, and a central tongue 11' formed in the film. Each group of tongues faces away from the spool and is displaced out of the plane of the surrounding material as shown in cross section in FIG. 5, which illustrates the relation of the tongues prior to any relative longitudinal movement between the adjacent layers of film and tape. As shown in FIG. 6, upon the occurrence of slippage between the film and tape, the central tongue 11' engages the adjacent edges 19 of the opening in the tape formed by punching one of the tongues 14' as hereinafter described, thereby mechanically interlocking the film with that layer of tape engaged by the tongue. The other layer of tape is likewise mechanically interlocked to the film in the same manner by the central tongues of those groups of tongues that are displaced in the opposite direction. In the illustrated embodiment, for example, the tongues in those groups nearest the spool are displaced in one direction while the two tongues near the end of the tape are displaced in the opposite direction.

Figure 3:
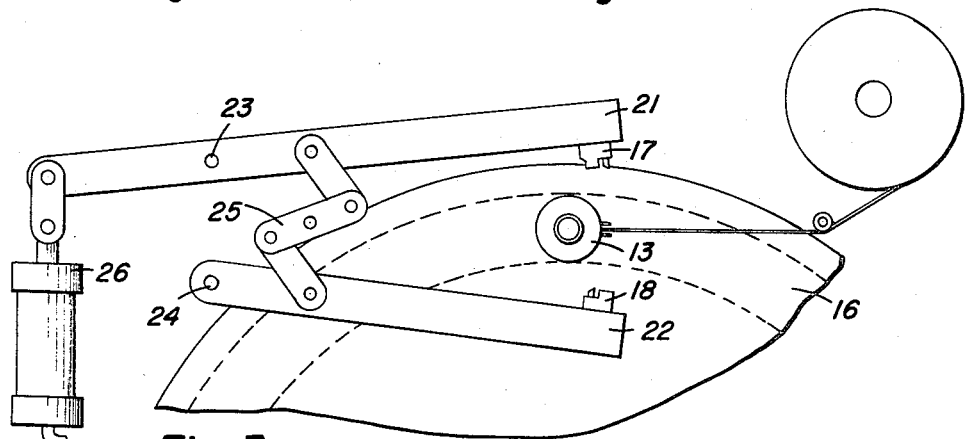
FIG. 3 is a schematic view of a tongue-forming mechanism in cooperation with a film spooling machine.

One embodiment of a device for forming such tongues as the film is spooled on a spooling machine is illustrated schematically in FIG. 3. The spooling machine comprises a circular conveyer 16 upon which a spool 13 is supported for movement to successive work stations about the periphery of the conveyer for the performance of various sequential operations necessary to form a completed roll of film. Since such spooling machines are fully disclosed by other references, for example by U.S. Patent 2,940,232, the details of the various work stations and of the operations of the machine which are not essential to understanding the present invention have been omitted.

The tongue forming device, as applied to such a machine, may comprise a pair of movable male and female punching members 17 and 18 located at opposite sides of the path of the film spool on the conveyer, said path being shown in broken lines in FIG. 3. The punching members are supported adjacent the conveyer over the path of the spool by levers 21 and 22 respectively, which, in turn are pivotally mounted on the machine at 23 and 24. When positioned as shown in FIG. 3, the punching members are spaced apart by a sufficient distance to allow a spool to pass between the two members to the position shown in solid lines, in which the film is adhesively, but not yet mechanically, attached to the spool.

When the spool has been so positioned, levers 21 and 22 and members 17 and 18 carried thereby are symmetrically moved together about pivots 23 and 24 by virtue of linkage 25 upon the actuation of an air cylinder 26 or similar operating means controlled by an automatic timing mechanism, not shown.

Figure 4:
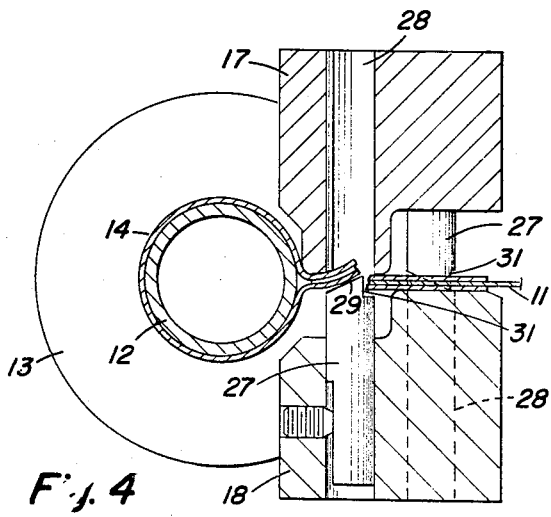
FIG. 4 is an enlarged cross sectional view showing the manner in which the tongues are formed by the punching members of a tongue forming mechanism.

As shown in FIG. 4, each of the punching members comprises a plurality of identical punches 27, which cooperate with mating die holes 28 aligned therewith, to form the tongues in the film and paper when the punching members are moved together as previously described. After the tongues have been thus formed, air cylinder 26 is actuated in the opposite direction to return the members to their former position prior to indexing the conveyer to bring a subsequent spool into position at the tongue forming station.

Figure 2:
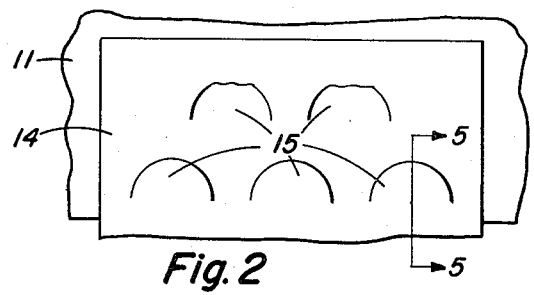
FIG. 2 is an enlarged plan view of the interlocking tongues formed in the film and tape.

In the position shown in FIG. 4, the punching members are in adjacent relation after the tongues have been formed but before the members have been moved apart. From this illustration it is apparent that the inclined face 29 of each punch 27 penetrates the film and tape only far enough to form a substantially semicircular tongue without excising any of the tape or film. Although each die hole 28 is of circular cross section, it should be noted that, in the preferred embodiment of the invention, each punch is provided with a flat surface 31 along its leading edge. This feature accounts for the difference in appearance of the tongues as shown in FIG. 2 in which the two upper tongues are visible from the punch side and the three lower tongues from the die side, and improves the effectiveness of the tongues by tearing rather than cutting the tape and paper along the leading edge of the punch, particularly in the layer adjacent the punch, thereby fraying the adjacent edges of the material and tending to prevent the tongues from being readily folded flat into their initial positions as subsequent convolutions of the film are formed on the spool.

Although, as illustrated, the oppositely disposed groups of tongues are located in rows, various other patterns and tongue configurations could also be employed. Likewise the invention is equally applicable to attaching the film to a tape connected at one end to the spool and having only one free end overlapping the film, or to the attachment of the film to a tape or similar intermediate connecting member by means of the tongues alone without adhesive. Since these and other modifications are within the spirit of the invention, the present disclosure is to be considered as illustrative only and not as limiting the scope of the invention which is defined by the following claims.

What we claim and desire to secure by Letters Patent of the United States is:

1. The method of mechanically attaching one end of a strip of photographic film to the free end of a tape connected to the core of a film spool in end-to-end relation to connect said one end of said film to said core, said method comprising; overlapping said one end of said film strip and said free end of said tape, maintaining said ends in overlapping relation, and, while so maintained, forming a first tongue in that portion of said film strip in overlapping relation with the free end of said tape and forming a second tongue in said free end of said tape in alignment with said first tongue, and displacing said aligned tongues together in the same direction out of the planes of said tape and film ends.

2. The method of mechanically attaching one end of a strip of photographic film to the free end of a tape connected to the core of a film spool in end-to-end relation to connect said one end of said film to said core, said method comprising; overlapping said one end of said film strip and said free end of said tape, maintaining said ends in overlapping relation, and, while so maintained, simultaneously forming aligned tongues in the overlapped ends of said tape and film strip and at the same time displacing said tongues out of the respective planes of the film and tape.

3. A method of mechanically interlocking in end-to-end relation one end of a strip of photographic film to the free end of an adhesively coated tape overlapping the end of the strip and adhesively adhering thereto and connected to the core of a film spool for connecting the end of the film to the spool, said method comprising; forming a first tongue in that portion of said film strip in overlapping relation with said tape and forming a second tongue aligned with said first tongue in said free end of said tape, and displacing said tongues together and in the same direction out of the planes of said tape and film ends.

4. A method according to claim 3 in which portions of said tape and film are torn in forming said tongues as distinguished from being cleanly cut.

5. In a roll of photographic roll film formed on a core, the combination comprising: an elongated strip of photographic film; a flexible tape connected to said core and having a free end overlapping an end of said strip in contacting end-to-end relation thereto; a first tongue-like member formed in that portion of said free end of said tape in overlapping relation with the end of said strip; a second tongue-like member formed in the end of said strip in alignment with said first tongue-like member, both of said tongue-like members being displaced in the same direction out of the planes of the surrounding material.

6. A construction according to claim 5 including a plurality of first tongue-like members and a plurality of second tongue-like members, each of said first tongue-like members being aligned with one of said second tongue-like members, at least one of said first tongue-like members and the second tongue-like member aligned therewith being displaced in a direction opposite to the direction of displacement of another of said first tongue-lke members and the second tongue-like member aligned therewith.

7. A construction according to claim 5 in which at least a portion of the edge surface of one of said tongue-like members comprises a torn edge as opposed to a cleanly cut edge to restrain the return of said tongue-like members into the plane of said tape and film ends when the film strip is wound up on said core.

8. A non-slip joint connecting a photographic film strip and another web in end-to-end relation comprising end portions of said film strip and web in overlapping face-to-face contact; a like number of similarly shaped tongue-like sections formed out of the overlapping portions of said film strip and web, each of the tongue-like sections of the web being in alignment with separate ones of the tongue-like sections of the film strip; each pair of aligned tongue-like sections in said web and film strip being displaced in the same direction out of the planes of said web and film strip and to such an extent that one of the displaced tongue-like sections of each aligned pair will extend into the opening left by displacement of the tongue-like section aligned therewith.

References Cited in the file of this patent

UNITED STATES PATENTS

| | | |
|---|---|---|
| 1,871,983 | Goldhammer | Aug. 16, 1932 |
| 2,552,222 | Schulz et al. | May 8, 1951 |
| 2,571,796 | Ulmschneider et al. | Oct. 16, 1951 |
| 2,775,413 | Liebman et al. | Dec. 25, 1956 |
| 2,865,452 | Porter | Dec. 23, 1958 |
| 2,866,505 | Forkner | Dec. 30, 1958 |